United States Patent [19]

Salyers

[11] 4,340,129

[45] Jul. 20, 1982

[54] ACOUSTICAL LAMINATE CONSTRUCTION AND ATTENUATED SYSTEMS COMPRISING SAME

[75] Inventor: Edward F. Salyers, Appollo, Pa.

[73] Assignee: Cabot Corporation, Kokomo, Ind.

[21] Appl. No.: 145,422

[22] Filed: May 1, 1980

[51] Int. Cl.³ .................... G10K 11/16; B32B 3/24; B32B 3/26

[52] U.S. Cl. .................... 181/200; 181/286; 181/288; 181/290; 181/291; 181/294; 181/DIG. 1; 428/131; 428/219; 428/316.6; 428/319.7

[58] Field of Search .................... 181/200–205, 181/211, 286, 288, 290–292, 294, DIG. 1; 52/144; 428/315, 320–321, 323, 211, 131; 352/35

[56] References Cited

U.S. PATENT DOCUMENTS

| | | | |
|---|---|---|---|
| 3,770,560 | 11/1973 | Elder et al. | 428/131 X |
| 4,110,510 | 8/1978 | Oliveira | 181/294 X |
| 4,121,005 | 10/1978 | Roberts | 428/315 X |
| 4,190,131 | 2/1980 | Robinson | 181/290 X |

FOREIGN PATENT DOCUMENTS

| | | | |
|---|---|---|---|
| 2735153 | 2/1979 | Fed. Rep. of Germany | 181/288 |
| 2800914 | 7/1979 | Fed. Rep. of Germany | 181/290 |
| 2744732 | 10/1979 | Fed. Rep. of Germany | 181/290 |
| 1254208 | 1/1961 | France | 181/292 |
| 909838 | 11/1962 | United Kingdom | 181/290 |

*Primary Examiner*—Joseph W. Hartary
*Assistant Examiner*—Thomas H. Tarcza
*Attorney, Agent, or Firm*—Jack Schuman; Robert F. Dropkin

[57] ABSTRACT

Disclosed herein is a flexible acoustical laminate construction which can be applied to noisy enclosures in order to attenuate noise therein. The construction of the invention finds particular use as a cabliner for the cabs or crew compartments of heavy construction, industrial, mining and transportation equipment of various types.

11 Claims, 2 Drawing Figures

ACOUSTICAL LAMINATE CONSTRUCTION AND ATTENUATED SYSTEMS COMPRISING SAME

BACKGROUND OF THE INVENTION

The present invention relates generally to polymeric laminate constructions and is more particularly concerned with a flexible acoustical laminate construction specifically adapted for application to noisy enclosure surfaces, thereby to attenuate deleterious noise within such enclosures.

Operators of heavy construction, industrial, mining and transportation equipment such as bulldozers, power shovels, trucks, graders, pugmills, jaw crushers, blasthole drills, wheeled front-end loaders, haulers, diesel powered shovels and draglines and the like are often subjected to noise levels of sufficient intensity as to be harmful to hearing. This is particularly so where such noise exposure is experienced on a chronic, day-to-day basis. There usually exist in such equipment three general pathways or mechanisms by which sound is transmitted into the operator or crew cabs thereof. Airborne sound can, of course, enter the cab from the exterior through openings in the cab. Sound, generated as mechanical vibrations by prime movers, hydraulic mechanisms and other ancillary equipment, can also be transmitted directly through the structure of the equipment and radiated therefrom into the cab. Also, sound can be introduced into the cab by excitation of the cab structure(s), such as sheet metal panels, by impingement of external noise thereon. Once sound has entered the cab, by whatever the mechanism, the intensity thereof can be amplified by airborne reflection within the cab structure. To a certain extent, this last-mentioned phenomenon of internally reflected sound is beneficial since this can represent a major source of sensory information by which the skilled equipment operator is enabled to monitor engine and hydraulic loads and to hear voice commands and conversation within the cab. Accordingly, it is a desideratum of the present invention to provide an acoustic laminate construction which, when suitably affixed to a noisy heavy equipment crew enclosure or operator cab, results in an overall substantial reduction of deleterious noise levels while preserving the capacity of the operator or crew to hear those sounds beneficial to effective and safe operations of the equipment.

SUMMARY OF THE INVENTION

In accordance with the invention there is provided a flexible acoustical laminate construction broadly comprising: (A) an energy-absorbing polymeric foam lamina having a thickness of at least about 0.2 inch, a loss factor, $\eta$, of at least about 0.4 taken at 25° C. and 100 Hz excitation frequency and (B) a weighted polymeric lamina having a density of at least about 0.5 lbs/ft$^2$, the natural resonant frequency of the overall construction being no greater than 1000 Hz.

The acoustically attenuated system of the invention comprises an enclosure to the surface of which the acoustical laminate construction of the invention is bonded with the polymeric foam lamina element thereof being oriented towards said enclosure surface.

DESCRIPTION OF THE PREFERRED EMBODIMENTS

Figure 2:
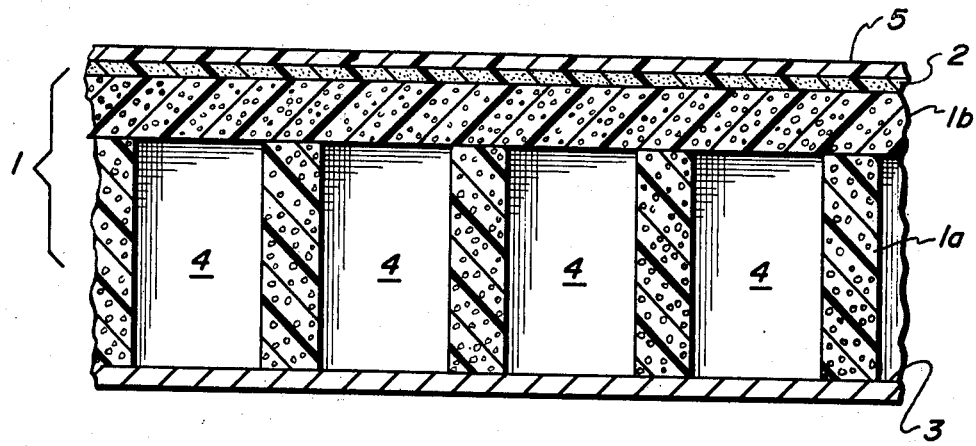
FIG. 2 hereof is a schematic, diagrammatic, cross-sectional view of a preferred embodiment of the acoustical laminate construction of the invention, said construction being shown bonded to the surface of a portion of an enclosure.
Figure 1:
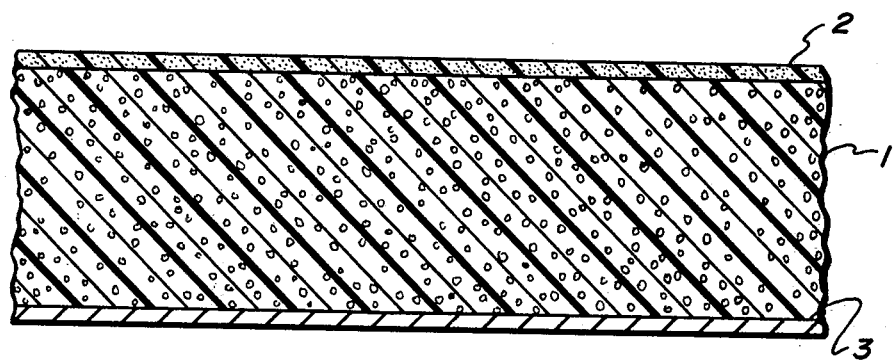
FIG. 1 hereof is a schematic, diagrammatic, cross-sectional view of one embodiment of the acoustical laminate construction of the invention, said construction being shown bonded to the surface of a portion of an enclosure.

Referring now to FIGS. 1 and 2, wherein like reference numerals refer to like structures, the flexible acoustical laminate construction of the invention broadly comprises a polymeric foam lamina 1 and a weighted polymeric lamina 2. The free surface of the polymeric foam lamina 1 of the construction is bonded, such as by means of a suitable adhesive, to the surface 3 of the enclosure to be acoustically treated therewith.

The polymeric foam lamina 1 has a thickness of at least 0.2 inch and can be composed of substantially any flexible sheet-form polymeric foam composition having a loss factor, $\eta$, of at least about 0.4, taken at 25° C. and 100 Hz excitation frequency. Preferably, the thickness of the polymeric foam lamina 1 will be at least about 0.5 inch. It is also preferred that the polymeric foam lamina 1 have a loss factor of at least about 0.6 under the stated conditions. Many specific polymers, copolymers, interpolymers and mixtures thereof may be employed in the preparation of a suitable foam lamina 1, the loss factor and resonant frequency characteristics of a polymeric foam composition usually being largely dependent upon factors other than the specific polymer employed, such as polymerizing conditions, the presence of specific additional components in the foam composition other than the polymer, per se, the blowing ingredients and specific blowing technique utilized, the specific physical form of the foam lamina 1 and the like. In respect of this last, for instance, FIG. 2 discloses a preferred embodiment of the invention wherein lamina 1 is composed of separate and distinct sub-laminae 1(a) and 1(b). Sub-lamina 1(a) is provided with a plurality of substantially uniformly distributed apertures 4 extending through the thickness thereof. Said apertures 4 can be formed in any suitable manner, such as by punching of the polymeric foam sheet material. This form of the polymeric foam sub-lamina 1(a) is preferred because it results in a completed laminate construction of relatively light weight. Moreover, the presence of a plurality of uniformly distributed apertures 4 through the polymeric foam sub-lamina 1(a) also serves to reduce the natural resonant frequency of the overall laminate construction of which it is an integral element. Thus, where a particular polymeric foam sheet material proposed for use as the lamina 1 is possessed of the necessary loss factor property but the laminate constructed therefrom has an excessively high natural resonant frequency, it is often possible to effectively lower the natural resonant frequency of the overall construction to within the ambit of the invention by resort to the bilaminar construction of lamina 1 of FIG. 2 and by perforation of the sub-lamina 1(a) element thereof in accordance with description above. Where this preferred multi-perforate embodiment of the sub-lamina 1(a) is employed the total surface defined by the plural apertures 4 will preferably represent about 50% of the overall surface of the sub-lamina 1(a).

In conjunction with this preferred construction of the lamina 1, there is interposed between said multi-perforate sub-lamina 1(a) and the weighted polymeric lamina 2 an intermediate continuous polymeric foam sub-lamina 1(b). Desirably, the thickness of said polymeric foam sub-lamina 1(b) will be considerably less than that of the multi-perforate polymeric foam sub-lamina 1(a). The polymeric foam laminae 1(a) and 1(b) elements make up the overall construction of the polymeric foam lamina 1 and should, therefore, normally be considered together as a single lamina for purposes of determination of loss factor. Nevertheless, when considered separately, it is desirable that the continuous polymeric foam sub-lamina 1(b) have a loss factor similar to that of the multi-perforate polymeric foam lamina 1(a). This ensures that effective acoustic coupling of the foam lamina 1 to the weighted polymeric lamina 2 will be maintained at low frequencies and that effective decoupling will occur at high frequencies.

In the preferred construction, wherein lamina 1 comprises an intermediate continuous polymeric foam sub-lamina 1(b) in combination with a multi-perforate polymeric foam sub-lamina 1(a), there is provided improved overall acoustic attenuation performance of the complete acoustical laminate construction. Moreover, this preferred construction of the lamina 1 is also desirable where a crash padding function is also to be served by the laminate construction of the invention, such as when installed in the overhead portion of a cab or crew enclosure.

A suitable test procedure by which both the loss factor of the polymeric foam sheet materials and the natural resonant frequency of the completed laminate construction can be determined is fully disclosed in the article, "Damping Measurements on Soft Visco-elastic Materials Using a Tuned Damper Technique," C. M. Cannon, E. D. Nashif and D. I. G. Jones, (1968) Shock and Vibration Bulletin, 38, pgs. 159–163, Naval Research Laboratory, Shock and Vibration Information Center, Washington, D.C. Said technique involves vibration excitation of the polymeric foam of the material or the laminate under test, the frequency of said excitation being controlled by mass loading of the test material or laminate of a laminate construction. The loss factor, $\eta$, is determined by substitution of the measured amplification factor, A, taken at 100 Hz excitation frequency, into the equation:

$$\eta = 1/\sqrt{A^2 - 1}.$$

The natural resonant frequency of the laminate construction is determined as follows. A sample of the laminate having a surface of at least four square inches is employed. The weighted lamina 2 is stripped from the foam lamina 1 and there is substituted for said lamina 2 a sheet metal member of equal area. An accelerometer is affixed to the exterior surface of the substitute sheet metal member, the thickness of said member being selected such that the combined weight of the member and accelerometer is equal to the weight of the stripped weighted lamina 2. The resulting sample is placed on the shaker table and the table forced to vibrate first at 20 Hz and progressively scanned through higher frequencies until a frequency of 1500 Hz is attained. The maximum or peak transmissibility occurs at that frequency which is taken to be the composite natural frequency.

As mentioned previously, many polymers, copolymers, interpolymers and mixtures thereof can be suitably polymerized, formulated, compounded, foamed and otherwise prepared into sheet-form foam compositions having the requisite loss factor and resonant frequency properties for use as the lamina 1 in the construction of the invention. Specific examples of generally suitable polymers are, for instance, polyvinylchloride, butyl rubber, flexible polyurethane, butadiene-acrylonitrile rubber, polytrifluorotrichloroethylene, polysulfide rubber, polynorbornene, GR-S rubber and the like. Suitable loss factor and/or resonant frequency characteristics can often be imparted to such polymers by compounding thereof with one or more of various flexibilizers and/or external and/or internal plasticizers. Said characteristics can also often be controlled by the specific blowing agent(s) utilized, the concentration(s) thereof employed and the conditions under which the polymeric material is blown into the final stabilized foam product. Accordingly, the precise manner in which a given polymeric foam material is provided with the essential loss factor characteristic and the completed laminate construction is provided with the required natural resonant frequency characteristic is not critical. A specific polymeric foam energy-absorbing material which has been found especially suitable for use as the lamina 1 is a highly plasticized polyvinylchloride sheet-form foam material sold under the tradename C-3002 by E-A-R Corporation, Indianapolis, Ind. Said polymeric foam sheet material has a loss factor, $\eta$, of about 0.6 at 25° C. and 100 Hz excitation frequency. Moreover, this material is essentially non-flammable and tends to char, rather than melt, both of which are important properties where the acoustic laminate construction of the invention is to be employed in the presence of flammable liquids and vapors such as gasoline, diesel oil, hydraulic fluids and the like.

The thickness of the weighted polymeric lamina 2 is preferably, although not necessarily, substantially less than that of the polymeric foam lamina 1. It is essential, however, that the weighted polymeric lamina 2 have a surface density of at least about 0.5 lbs/ft$^2$, the preferred surface density thereof being at least about 1 lb/ft$^2$. As in the case of the polymeric foam lamina 1, the specific polymeric material employed in the construction of the weighted polymeric lamina 2 is not of particular criticality with respect to the invention provided that said lamina 2 be flexible and meet the minimum surface density requirement stated hereinbefore. Weighted polymeric flexible sheets suitable for use as the lamina 2 of the invention are conventionally produced by compounding of a polymeric matrix with a dense particulate solid filler, such as a metal powder or metal compound. One suitable type of commercially available weighted polymeric sheet material comprises polyvinylchloride having barium sulfate filler compounded therein. As in the case of the polymeric foam lamina 1, polyvinylchloride represents a generally preferred polymer type for the fabrication of the weighted lamina 2 due to its non-flammability and charring properties.

Where the weighted polymeric lamina 2 is to define the exteriormost surface of the laminate construction of the invention it will generally also be desirable that said lamina 2 be possessed of substantial cut and abrasion resistance, thereby to provide good service life to the construction. Where the weighted lamina 2 is formed of polyvinylchloride, polyurethane or butyl rubber, such cut and abrasion resistance will usually be inherent due to the nature of the polymeric material of construction. However, good cut and abrasion resistance can also be provided by the provision (FIG. 2) of an exteriormost separate wear lamina 5 bonded to the exterior surface of the weighted polymeric lamina 2. Said wear lamina 5 can also serve a cosmetic function and, for instance, can consist of a calendered, pigmented polyvinylchloride sheet material of the type utilized for automotive upholstery. When a separate and distinct wear lamina 5 is employed, the contribution of its mass to the surface density of weighted polymeric lamina 2 should be taken into account.

The various laminae making up the flexible acoustical laminate construction of the invention are, of course, bonded together to complete the construction. Said bonding may be achieved by any suitable technique known in the art, such as by adhesive bonding; hot melt laminating or solvent, thermal or ultrasonic welding.

As mentioned previously, the completed acoustical laminate construction of the invention should have a natural resonant frequency of no greater than about 1000 Hz. Preferably, the resonant frequency thereof will be no greater than about 500 Hz.

There follows an illustrative, non-limiting example.

EXAMPLE

An International Harvester TD 25 Series C bulldozer, equipped with a Campbell Greenline 3000 Detachable Cab and a frame-mounted roll-over protective cage formed of heavy-wall tubing, was the equipment utilized for sound attenuation treatment in accordance with the present invention. Prior to said treatment, however, the cab was first instrumented with a Gen-Rad 1933, Type I Precision Sound Level Meter and a Gen-Rad Type 1944 Noise Dosimeter equipped with a Type 1944-9702 Noise Exposure Indicator. The bulldozer was then operated under various no blade load conditions in order to establish baseline noise levels. The instrumentation microphones were positioned to either side of and near the operator's head in order that the noise levels detected thereby approximated, as closely as practicable, the noise levels actually suffered by the operator. The resulting data are presented in Tables I and II under the "UNTREATED" columns. As will be noted, the noisiest condition of operation of this equipment occurred in the Moving, Second Gear Reverse mode of operation while the quietest operation was experienced in the Stationary, Low Idle condition.

Next, the cab was removed from the bulldozer and the entire non-glass interior thereof, which represented only about 50% of the entire cab surface, was lined with a flexible acoustic laminate construction in accordance with the invention. Said laminate had a natural resonant frequency of less than 500 Hz and comprised the following elements:

Lamina 1

Sub-lamina 1(a)—a highly plasticized polyvinylchloride foam sheet, E-A-R C-3002, having a thickness of about 0.7 inch, a loss factor, $\eta$, of about 0.6 at 25° C. and 100 Hz excitation frequency; said sheet having a plurality of substantially uniformly distributed apertures 4 punched through the thickness thereof, each aperture 4 having a diameter of about 0.6 inch and the surface of said apertures 4 being, in the aggregate, about 50% of the overall surface of said sub-lamina 1(a).

Sub-lamina 1(b)—a continuous sheet of E-A-R C-3002 having a thickness of about 0.25 inch.

Lamina 2

A flexible filled polyvinylchloride sheet material having a thickness of about 0.1 inch, said sheet comprising barium sulfate filler in an amount sufficient to provide a surface density of about 1 lb/ft$^2$.

Lamina 5

None.

The respective sub-laminae 1(a) and 1(b) and lamina 2 were adhesively bonded together into the laminate construction and the laminate construction bonded to the cab interior by means of Coustibond, a polyurethane adhesive sold by Ferro Corporation, Cleveland, Ohio.

In order to isolate the roll-over protection cage from equipment vibrations transmitted through the frame of the equipment the annular frame recesses into which the cage tubing was fitted were each provided with energy-absorbing bushings and side shims. In addition, the installation of the laminate construction of the invention to the roof area of the cab was performed after reinstallation of the cab to the bulldozer. Thus, as to the roof area of the cab, the laminate construction of the invention was installed over the roll-over cage and the interior surface of the cab roof.

Next, the bulldozer was operated under similar conditions and over the same roadway as was utilized in establishing the baseline noise levels. The resulting data are shown in Tables I and II under the "TREATED" columns.

TABLE I

SOUND LEVEL METER

| Bulldozer Operation Mode | UN-TREATED dB(A) | TREATED dB(A) | NOISE REDUCTION DUE TO TREATMENT dB(A) |
|---|---|---|---|
| Stationary | | | |
| Low Idle | 98 | 86 | 12 |
| High Idle | 105 | 93 | 12 |
| Moving | | | |
| 2nd Gear Fwd. | 105 | 93 | 12 |
| 2nd Gear Rev. | 106 | 95 | 11 |

TABLE II

PREDICTED TIME WEIGHTED dB(A) NOISE EXPOSURE LEVELS AT VARIOUS EXPOSURE TIMES AND COMPARISONS OF EXPOSURE LEVELS TO MSHA TABLE G-16 EXPOSURE STANDARDS (DOSIMETER)

| Time of Exposure Hours (Leg) | UNTREATED dB(A) | % OF MSHA STD. | TREATED dB(A) | % OF MSHA STD | TIME-WEIGHTED NOISE REDUCTION dB(A) |
|---|---|---|---|---|---|
| 8 | 101.7 | 506 | 86.4 (av.) | 61 | 15.3 |
| 7 | 100.7 | 443 | 85.3 | 53 | 15.4 |
| 6 | 99.6 | 379 | 84.6 | 49 | 15.0 |
| 5 | 98.3 | 316 | 83.0 | 38 | 15.3 |
| 4 | 96.6 | 253 | 81.3 | 30 | 15.3 |

In Table II, the actual recorded noise levels are compared against Table G-16 of the Noise Standard, which Table G-16 was prepared by the U.S. Mine Safety and Health Administration in order to establish maximum time-weighted safe noise level exposure criteria for mine workers. In the columns of Table II marked "% OF MSHA STD." the sensed levels of the equipment are expressed as percentages of the Table G-16 criteria.

Reference to Table I reveals that, after sound attenuation treatment in accordance with the invention, the noise level within the cab, even under the noisiest mode of equipment operation, is less than that experienced in the untreated cab under the least noisy mode of equipment operation. Secondly, the Table 1 data reveals a general noise level reduction, under any of the tested modes of operation, of over 10 dBA.

Reference to Table II discloses that, in the untreated cab, compliance with the time-weighted noise exposure standards of MSHA Table G-16 is not attained. In fact, assuming an average noise level of about 101 dB(A) for the untreated cab, the operator can spend only about 1.75 hours of productive time in order to remain in compliance with said standards. However, after treatment of the cab in accordance with the invention, even a full eight hour work shift results in the exposure of the operator to only about 61% of the MSHA maximum noise exposure standard.

Obviously, many changes, alterations, modifications and the like may be made in the above description and example without departing from the essential spirit and scope of the invention. For instance, the acoustical laminate construction of the invention can comprise cosmetic, wear and acoustically functional laminae in addition to the essential polymeric foam and weighted polymeric laminae specifically disclosed above. Thus, the scope of the invention is intended to be circumscribed only in light of the teachings of the claims appended hereto.

What is claimed is:

1. An acoustic laminate construction comprising:
   (A) a first lamina having a thickness of at least 0.2 inch and being composed of an energy-absorbing flexible polymeric foam composition, said lamina having a loss factor, $\eta$, of at least 0.4 at 25° C. and 100 Hz excitation frequency:
   (B) a second lamina composed of a flexible polymeric weighted composition, said second lamina having a surface density of at least about 0.5 lb/ft$^2$, said second lamina being of substantially less thickness than said first lamina;
   the natural resonant frequency of the overall laminate construction being no greater than about 1000 Hz.

2. The acoustic laminate construction of claim 1 wherein $\eta$ is at least 0.6.

3. The acoustic laminate construction of claim 1 wherein the natural resonant frequency of said construction is no greater than about 500 Hz.

4. The acoustic laminate construction of claim 1 wherein said first polymeric foam lamina comprises a first sub-lamina and a second sub-lamina, said first sub-lamina having a plurality of essentially uniformly distributed apertures through the thickness thereof and said second sub-lamina being substantially continuous and having a loss factor similar to that of said first sub-lamina.

5. The acoustic laminate construction of claim 4 wherein the surface defined by the aggregate of said plurality of apertures of said first sub-lamina is about 50% of the total surface thereof.

6. The acoustic laminate construction of claim 4 wherein each of said sub-lamina is composed of a highly plasticized polyvinylchloride foam material.

7. The acoustic laminate construction of claim 1 wherein said first lamina is composed of a highly plasticized polyvinylchloride foam material.

8. The acoustic laminate construction of claim 1 wherein the surface density of said second lamina is at least about 1.0 lb/ft$^2$.

9. The acoustic laminate construction of claim 1 wherein said second lamina is composed of polyvinylchloride having a substantial quantity of barium sulfate filler dispersed therein.

10. A sound attenuated enclosure comprising an enclosure having bonded to the surface thereof the acoustic laminate construction of any of claims 1 through 9, inclusive.

11. A sound attenuated cab or enclosure for heavy industrial, mining, construction or vehicular equipment comprising a cab or enclosure adapted to enclose one or more equipment operators therein and, bonded to the surface of said cab, the acoustic laminate construction of any of claims 1 through 9, inclusive.

* * * * *